No. 832,796. PATENTED OCT. 9, 1906.
E. KIMBER.
CERTIFICATE OF DEPOSIT.
APPLICATION FILED OCT. 6, 1903.

Witnesses;
Franklin T. Chany
M. W. Upham

Inventor,
Emmor Kimber;
By A. B. Upham,
His Attorney.

No. 832,796. PATENTED OCT. 9, 1906.
E. KIMBER.
CERTIFICATE OF DEPOSIT.
APPLICATION FILED OCT. 6, 1903.

Fig. 3

Witnesses;
Franklin T. Khany.
M. W. Upham.

Inventor,
Emmor Kimber;
By A. B. Upham,
His Attorney

UNITED STATES PATENT OFFICE.

EMMOR KIMBER, OF BOSTON, MASSACHUSETTS, ASSIGNOR TO HENRY V. BOYER, OF BROOKLYN, NEW YORK.

CERTIFICATE OF DEPOSIT.

No. 832,796.    Specification of Letters Patent.    Patented Oct. 9, 1906.

Application filed October 6, 1903. Serial No. 175,943.

*To all whom it may concern:*

Be it known that I, EMMOR KIMBER, a citizen of the United States, and a resident of Boston, in the county of Suffolk, State of Massachusetts, have invented certain new and useful Improvements in Certificates of Deposit, of which the following is a full, clear, and exact description.

The object of this invention is the effecting of means whereby a specified sum of money can be deposited in a bank or other financial institution and a certificate therefor be issued capable of being transferred by the depositor to various people and in different fractional amounts, never, of course, in excess of the amount deposited. My invention for this purpose comprises two parts, the first consisting of the certificate of deposit proper and the other of the forwarding draft or check. The certificate is formed in several parts or sections, certain of which consist of a number of detachable coupons or stamps, each having some fractional amount of money designated thereon, the sum of which foots up to the face value of the certificate and without which the other part of the certificate is without value. The forwarding-draft consists simply of a slip, preferably of the usual size of a bank-check, upon which certain of the coupons or stamps from the certificate may be affixed, their total value inscribed thereon, and the back thereof indorsed with the name of the person or concern to whom it is desired to have paid the sum of money indicated by such total value. The indorsee having received and deposited this draft in his local bank is credited therewith in the same manner as an ordinary check or draft and the forwarding-draft sent on to the bank or trust company which issued the certificate.

Referring to the drawings, forming part of this specification, Figure 1 is a face view of my certificate of deposit proper, indicating but a fraction of the indexing-stub, which is designed to form a part thereof as originally printed. Fig. 2 is a face view of the forwarding-draft; and Fig. 3 is a face view showing said stub and its position relative to the balance of the certificate.

As shown in Fig. 1, the certificate of deposit is formed with a section or part B, containing the name and address of the concern issuing it, the number of the certificate, the name of the depositor, the amount deposited, the date thereof, and the signature of the cashier or other person authorized to sign the certificate. The coupons or stamps A are preferably made quite small in size and are separated from each other and the section B by lines of perforations D to permit of easy detachment. Each coupon or stamp contains, in addition to the numerals indicative of monetary value, the same series or individual number which is printed upon the section B, said numerals being of course fractional parts of the face value of the certificate and of considerable variety in order to permit of such combinations thereof as to make up any desired sum in dollars and cents within the total amount for which the certificate is issued.

I prefer that each certificate of a series shall be issued for the same specified amount, as ten dollars, no matter what sum may be deposited by a single person, as many certificates being given to him as are necessary to equal the money paid in. I also prefer to arrange the coupons or stamps in ten rows, each row parallel with the section B, with the values indicated thereon footing up to one dollar, the numerals "50 25 10 5 3 2 2 1 1 1" proving the most suitable for the purpose, and to provide the variety above referred to.

In addition to the certificate-number and the value numerals I prefer to have printed upon each coupon or stamp a certain amount of reading matter certifying more fully as to the value thereof and stating by whom and where issued. This may be of such a style and tint of line as to reduce to a minimum the possible danger of counterfeiting. Such danger is, however, very small, for the reason that each certificate is issued for but a comparatively trifling amount. Further, inasmuch as each coupon or stamp contains the individual number of the certificate the bank receiving a forwarding-draft can at once refer to the number, and hence account, of the depositor and ascertain if the certificate has or has not been fully redeemed. If it has or if the forwarding-draft overdraws the account, then the bank knows that all in excess thereof must be counterfeit.

While the certificate of deposit as thus far described is complete so far as the depositor is concerned, I have further improved upon it for the purpose of simplifying the bookkeeping work of the bank issuing the same.

This improvement consists in forming the certificate with a stub C, separable from the remainder by suitable perforations and containing the individual number of the certificate, the date of issue, the name, address, and signature of the depositor, and spaces for the entrance of the various sums and dates of payment thereof as paid out by the coupons or stamps on the forwarding-drafts, and also containing a memorandum of the amount in dollars and cents of the certificate. This forms a card-index and at the same time as complete a system of bookkeeping as is necessary and a signature-book for the ready comparison of the signature on each forwarding-draft.

The manner in which these certificates of deposit are used as a convenient means for paying small bills by mail consists in removing from a certificate enough of the coupons or stamps to make up the sum to be paid and then pasting them upon the forwarding-draft, the backs thereof being gummed for the purpose, or the face of the forwarding-draft being similarly treated, but the former method being preferable. The drawer of this draft then inscribes thereon the total amount indicated by the coupons or stamps and then upon the back thereof writes his own name and the name of the person or concern to whom he wishes the draft paid in the customary manner of backing checks. This forwarding-draft then becomes practically a certified check, since the coupons or stamps thereon prove absolutely that the money is still on deposit and cannot be withdrawn except by the presentation of the stamps themselves. Further, the forwarding-draft being impossible of being raised above the limit of ten dollars or other designated sum for which each certificate of the series is issued, the temptation to this form of fraud is rendered practically nothing. So, also, since the coupons or stamps must be printed with special inks and on special paper the expense of raising such a check is necessarily made greater than the sum which can be realized therefrom. Moreover, this system permits of depositing small sums of money in a bank and having them subject to check, and yet without check-book, pass-book, or an expensive keeping of accounts, which is ordinarily prohibitive of small accounts. I design that the banks or trust companies adopting this system advertise to pay interest upon the deposits so long as the certificates thereof remain unbroken. When, however, a forwarding-draft comes back to the bank, even for a small amount, then the certificate against which it is drawn ceases to accumulate further interest. In this manner when a man deposits a certain sum of money—one hundred dollars, for instance—and receives ten certificates therefor he knows that he is receiving interest upon the whole sum until such time as he breaks one of the certificates, when interest upon that one ceases, but continues upon the remainder. It is only necessary for him to write upon the section B the date of the first coupons or stamps removed in order to keep track of his interest account. The bank, on the other hand, notes upon their stub C the dates of the forwarding-drafts, and so can see at a glance when interest is to cease upon the face of the certificate. By means of this arrangement small depositors can keep a bank-account, draw certified checks against the same to any amounts from one cent up to ten dollars, receive interest on the unbroken certificates, and at the same time be able to forward by mail without trouble, expense, or danger of loss the exact pay for any articles, books, or magazines which they may desire. This is an advantage of which few can realize the great importance who have not been in the mail-order or publication business. It is of equal importance to the banker, for the reason that he thereby attracts to his treasury an aggregate of deposits which will foot up to an enormous sum, and at the same time the cost of issuing the certificates and of keeping track of the deposits is so comparatively slight as to be almost beneath consideration. Further, a large proportion of this money can be loaned at good rates and for long times, inasmuch as the depositors will only draw in small sums and at infrequent intervals, both because they are accumulating interest on the unbroken certificates and because they wish to keep money on deposit for the convenience of mailing small payments. Hence the money will be far steadier in the banker's hands than the deposits of a small number of business men each with a large account.

What I claim as my invention, and for which I desire Letters Patent, is as follows, to wit:

1. A certificate of deposit comprising a single sheet, one section of which contains a numbered certificate showing the deposit of a designated amount of money in a bank or trust company by a person named thereon, and other sections consisting of stamps or coupons separated from each other by weakened lines, and each stamp or coupon having thereon the number of said certificate, the name of said bank or trust company, and a small sum of money, the total of which on all of said stamps or coupons equals the amount of money designated on said certificate, substantially as described.

2. A certificate of deposit containing a single sheet having one section containing a numbered certificate showing the deposit of a designated amount of money in a bank or trust company by a person named thereon, another section containing the number of said certificate, the name of said depositor, and blank spaces for the insertion of other matter and other sections separated from each other by weakened lines and each having thereon the number of said certificate, the name of said bank or trust company and a small sum of money, the total of which on all of said last-named sections equals the amount of money designated on said certificate, substantially as described.

3. A certificate of deposit comprising a single sheet having one section containing a numbered certificate showing the deposit of a designated amount of money in a bank or trust company by a person named thereon, another section containing the number of said certificate, the name of the depositor and blank spaces for the insertion of other matter, and other sections consisting of stamps or coupons separated from each other by weakened lines and each having thereon the number of said certificate, the name of said bank or trust company, and a small sum of money, the total of which on all of said stamps or coupons equals the amount of money designated on said certificate in combination with a forwarding-draft for said fractional certificates of deposit, substantially as described.

In testimony that I claim the foregoing invention I have hereunto set my hand this 3d day of October, 1903.

EMMOR KIMBER.

Witnesses:
 FRANKLIN V. CHANEY,
 A. B. UPHAM.